(12) United States Patent
Chen (10) Patent No.: US 9,046,736 B2
(45) Date of Patent: Jun. 2, 2015

(54) IMAGE STABILIZER AND IMAGE CAPTURING DEVICE (71) Applicant: HON HAI PRECISION INDUSTRY CO., LTD., New Taipei (TW)

(72) Inventor: Yu-Han Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 170 days.

(21) Appl. No.: 13/787,852

(22) Filed: Mar. 7, 2013

(65) Prior Publication Data
US 2014/0028906 A1  Jan. 30, 2014

(30) Foreign Application Priority Data

Jul. 30, 2012 (TW) .............................. 101127423 A (51) Int. Cl.
H04N 5/228 (2006.01)
H04N 5/225 (2006.01)
G03B 5/00 (2006.01)

(52) U.S. Cl.
CPC ........................................ G03B 5/00 (2013.01)

(58) Field of Classification Search
None
See application file for complete search history.

(56) References Cited

U.S. PATENT DOCUMENTS

2011/0252782 A1* 10/2011 Nobe .............................. 60/527
2012/0019675 A1*  1/2012 Brown ....................... 348/208.2

* cited by examiner

Primary Examiner — Aung S Moe
Assistant Examiner — Euel Cowan
(74) Attorney, Agent, or Firm — Novak Druce Connolly Bove + Quigg LLP (57) ABSTRACT An image stabilizer includes a stationary frame, a moveable frame, and a driving assembly. The stationary frame defines a central axis and includes an upper end, a lower end opposite to the upper end, and a first protrusion extending from the upper end. The moveable frame is elastically connected to the upper end and coincides with the stationary frame. The driving assembly includes two first metal clips and a first SMA line. The first metal clips are connected to two neighboring side surfaces of the moveable frame. Opposite ends of the first SMA line are clipped to the respective first metal clips. A bending portion of the first SMA line between the opposite sides contacts and hooks the first protrusion.

15 Claims, 7 Drawing Sheets

IMAGE STABILIZER AND IMAGE CAPTURING DEVICE

BACKGROUND

1. Technical Field

The present disclosure relates to imaging technologies and, particularly, to an image stabilizer and an image capturing device using the image stabilizer.

2. Description of Related Art

A shape memory alloy (SMA) based actuator is widely used in a camera to compensate vibration of the camera. The SMA based actuator includes a number of shape memory alloy lines (SMA lines). However, the SMA lines cross each other. This may cause short circuit.

Therefore, it is desirable to provide an image stabilizer and an image capturing device having the image stabilizer, which can overcome or alleviate the above-mentioned problems.

DETAILED DESCRIPTION

Figure 1:
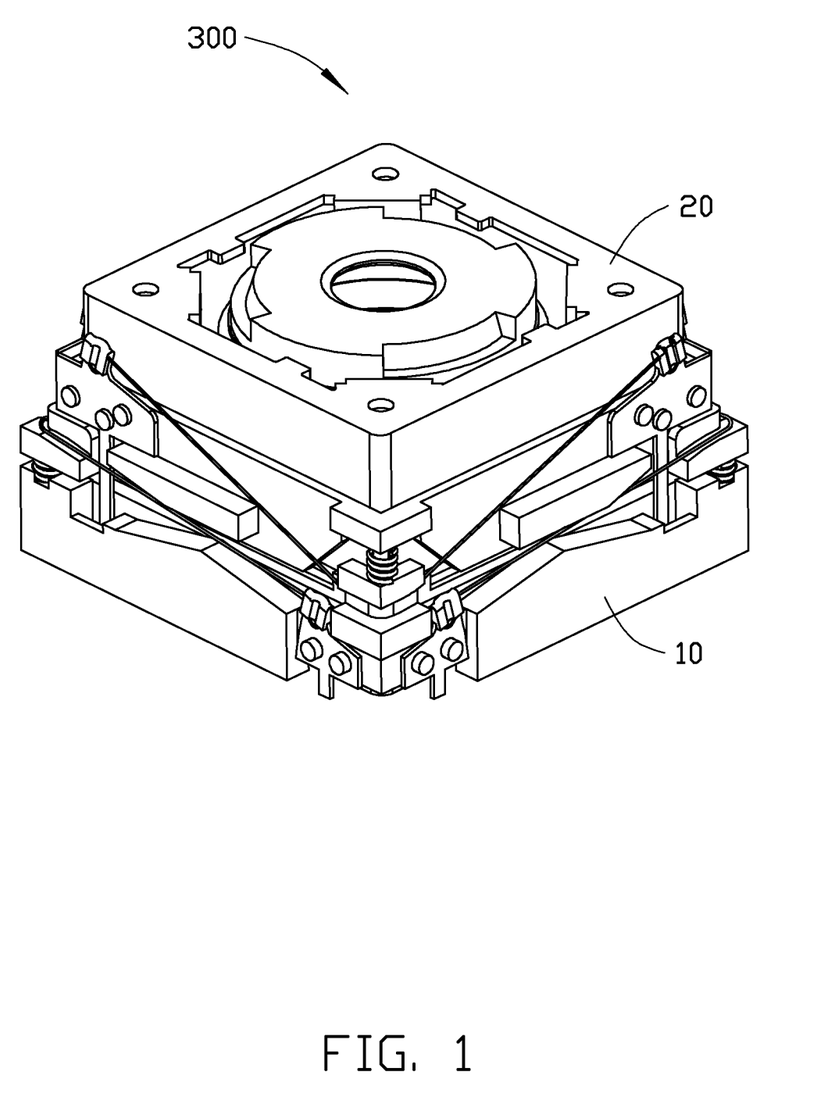
FIG. 1 is a schematic, isometric view of an image capturing device including an image stabilizer and a camera module, according to a first exemplary embodiment.

FIG. 1 is an image capturing device 300, according to a first exemplary embodiment. The image capturing device 300 includes an image stabilizer 10 and a camera module 20.

Figure 3:
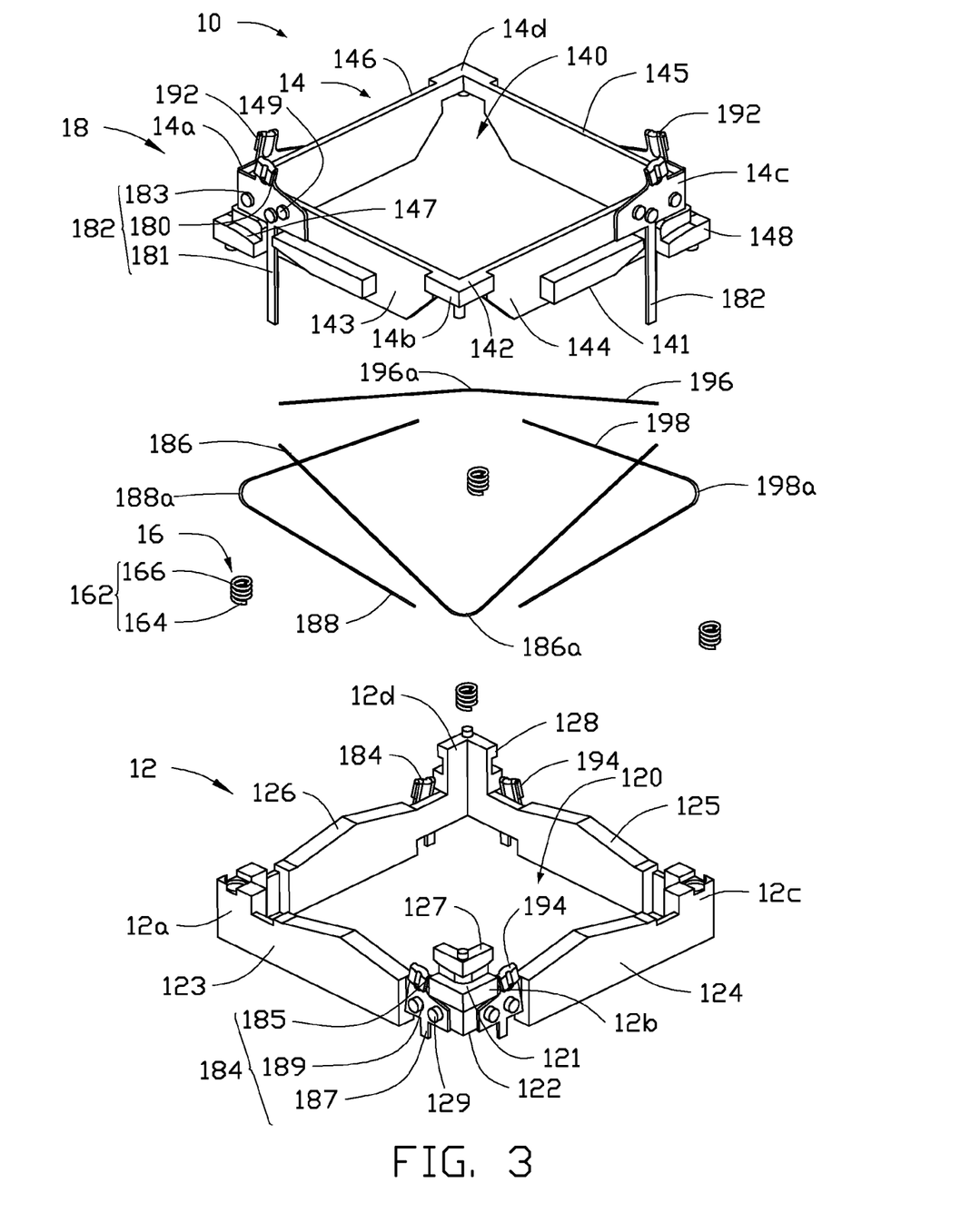
FIG. 3 is an exploded view of the image stabilizer of FIG. 2.

FIG. 3 shows that the image stabilizer 10 includes a stationary frame 12, a moveable frame 14, a resilient assembly 16, and a driving assembly 18.

The stationary frame 12 is substantially cuboid with a central axis OO', and may be fixed to an electronic device, such as a cell phone (not shown). The stationary frame 12 includes an upper end 121, a lower end 122, a first sidewall 123, a second sidewall 124, a third sidewall 125, a fourth sidewall 126, a first protrusion 127, and a second protrusion 128.

The upper end 121 and the lower end 122 are positioned at opposite sides of the stationary frame 12. The first sidewall 123, the second sidewall 124, the third sidewall 125, and the fourth sidewall 126 perpendicularly connect each other end-to-end to form a first receiving room 120. In detail, the first sidewall 123 and the third sidewall 125 are positioned at opposite sides of the stationary frame 12, and the first sidewall 123 is parallel to the third sidewall 125. The second sidewall 124 and the fourth sidewall 126 are positioned at opposite sides of the stationary frame 12, and the second sidewall 124 is parallel to the fourth sidewall 126. The fourth sidewall 126 and the first sidewall 123 intersect at a first joint 12a. The first sidewall 123 and the second sidewall 124 intersect at a second joint 12b. The second sidewall 124 and the third sidewall 125 intersect at a third joint 12c. The third sidewall 125 and the fourth sidewall 126 intersect at a fourth joint 12d. The first protrusion 127 and the second protrusion 128 perpendicularly extend from the upper end 121. The first protrusion 127 is arranged at the second joint 12b, and the second protrusion 128 is arranged at the fourth joint 12d.

Two engagement posts 129 extend from an outer surface of each of the four sidewalls 123, 124, 125 and 126. In detail, the engagement posts 129 on the outer surface of the first sidewall 123 are arranged at the second joint 12b. The engagement posts 129 on the outer surface of the second sidewall 124 are arranged at the second joint 12b. The engagement posts 129 on the outer surface of the third sidewall 125 are arranged at the fourth joint 12d. The engagement posts 129 on the outer surface of the fourth sidewall 126 are arranged at the fourth joint 12d.

The moveable frame 14 is substantially cuboid and defines a central axis coinciding with the central axis OO' of the stationary frame 14. The moveable frame 14 includes a bottom end 141, a top end 142, a first side surface 143, a second side surface 144, a third side surface 145, a fourth side surface 146, a first projection 147, and a second projection 148.

The bottom end 141 and the top end 142 are positioned at opposite ends of the moveable frame 14, and the bottom end 141 faces the upper end 121. The first side surface 143, the second side surface 144, the third side surface 145, and the fourth side surface 146 perpendicularly connect each other end-to-end to form a second receiving room 140. In detail, the first side surface 143 and the third side surface 145 are positioned at opposite ends of the moveable frame 14, and the first side surface 143 is parallel to the third side surface 145. The second side surface 144 and the fourth side surface 146 are positioned at opposite ends of the moveable frame 14, and the second side surface 144 is parallel to the fourth side surface 146. The fourth side surface 146 and the first side surface 143 intersect at a first junction 14a. The first side surface 143 and the second side surface 144 intersect at a second junction 14b. The second side surface 144 and the third side surface 145 intersect at a third junction 14c. The third side surface 145 and the fourth side surface 146 intersect at a fourth junction 14d. The first projection 147 and the second projection 148 perpendicularly extend from the bottom end 141. The first projection 147 is arranged at the first junction 14a, and the second projection 148 is arranged at the third junction 14c.

In this embodiment, the positions of the first side surface 143, the second side surface 144, the third side surface 145, and the fourth side surface 146 correspond to those of the first sidewall 123, the second sidewall 124, the third sidewall 125, and the fourth sidewall 126. Accordingly, the positions of the first junction 14a, the second junction 14b, the third junction 14c, and the fourth junction 14d correspond to those of the first joint 12a, the second joint 12b, the third joint 12c, and the fourth joint 12d.

Three engagement poles 149 extend from each of the four side surfaces 143, 144, 145, and 146. In detail, the engagement poles 149 on the first side surface 143 are arranged at the first junction 14a. The engagement poles 149 on the second side surface 144 are arranged at the third junction 14c. The engagement poles 149 on the third side surface 145 are arranged at the third junction 14c. The engagement poles 149 on the fourth side surface 146 are arranged at the first junction 14a.

The resilient assembly 16 includes four compression springs 162. Each compression spring 162 includes a first end 164 and a second end 166. The first end 164 and the second end 166 are positioned at opposite ends of each of the compression springs 162. The first end 164 of each of the compression springs 162 is fixedly connected to the upper end 121, and the second end 166 of each of the compression springs 162 is fixedly connected the bottom end 141, thus the moveable frame 14 is elastically connected to the stationary frame 12. The first receiving room 120 communicates with the second receiving room 140. In this embodiment, the four first ends 164 are connected to the four joints 12a, 12b, 12c, and 12d, respectively, and the four second ends 166 are connected to the four junctions 14a, 14b, 14c, and 14d, respectively.

The driving assembly 18 includes two first metal clips 182, two second metal clips 184, two third metal clips 192, two fourth metal clips 194, a first SMA line 186, a second SMA line 188, a third SMA line 196, and a fourth SMA line 198.

Each of the first metal clips 182 is made of conductive material and includes a first clipping groove 180, a first soldering pin 181, and three engagement holes 183 corresponding to the three engagement poles 149 on the first side surface 143 and the three engagement poles 149 on the second side surface 144. The engagement poles 149 engage in the corresponding engagement holes 183 so that the two first metal clips 182 are fixedly connected to the first side surface 143 and the second side surface 144, respectively. The first soldering pins 181 are soldered to an external circuit board to feed current into the first metal clips 182. It is understood that the two first metal clips 182 may be fixedly connected to the first side surface 143 and the second side surface 144 by soldering or using glue.

Opposite ends of the first SMA line 186 are clipped in the first clipping grooves 180 of the two first metal clips 182. A bending portion 186a between the opposite ends of the first SMA line 186 contacts and hooks the first protrusion 127. In this embodiment, the bending portion 186a is arranged in the middle of the first SMA line 186.

Each of the second metal clips 184 is made of conductive material and includes a second clipping groove 185, a second soldering pin 187, and three fastening holes 189 corresponding to the three engagement posts 129 on the first sidewall 123 and the three engagement posts 129 on the fourth sidewall 126. The engagement posts 129 engage in the corresponding fastening holes 189 so that the two second metal clips 184 are fixedly connected to the first sidewall 123 and the fourth sidewall 126, respectively. The second soldering pins 187 are soldered to an external circuit board to introduce current into the second metal clips 184. It is understood that the two second metal clips 184 may be fixedly connected to the first sidewall 123 and the fourth sidewall 126 by soldering or using glue.

Opposite ends of the second SMA line 188 are clipped in the second clipping grooves 185 of the two second metal clips 184. A bending portion 188a between the opposite ends of the second SMA line 188 contacts and hooks the first projection 147. In this embodiment, the bending portion 188a is arranged in the middle of the second SMA line 188.

Structures and the installation methods of the two third metal clips 192 are substantially the same as those of the two first metal clips 182. The differences between the two third metal clips 192 and the two first metal clips 182 are: the two third metal clips 192 are fixedly connected to the third side surface 145 and the fourth side surface 146. The third metal clip 192 connected to the third side surface 145 is positioned at the third junction 14c, and the third metal clip 192 connected to the fourth side surface 146 is positioned at the first junction 14a. Opposite ends of the third SMA line 196 are connected to the two third metal clips 192, and a bending portion 196a between the opposite ends of the third SMA line 196 contacts and hooks the second protrusion 128. In this embodiment, the bending portion 196a is arranged in the middle of the third SMA line 196.

Structures and the installation methods of the two fourth metal clips 194 are substantially the same as those of the two second metal clips 184. The differences between the two fourth metal clips 194 and the two second metal clips 184 are: the two fourth metal clips 194 are fixedly connected to the second sidewall 124 and the third sidewall 125. The fourth metal clip 194 connected to the second sidewall 124 is positioned at the second joint 12b, and the fourth metal clip 194 connected to the third sidewall 125 is positioned at the fourth joint 12d. Opposite ends of the fourth SMA line 198 are connected to the two fourth metal clips 194, and a bending portion 198a between the opposite ends of the fourth SMA line 198 contacts and hooks the second projection 148. In this embodiment, the bending portion 198a is arranged in the middle of the fourth SMA line 198.

Figure 2:
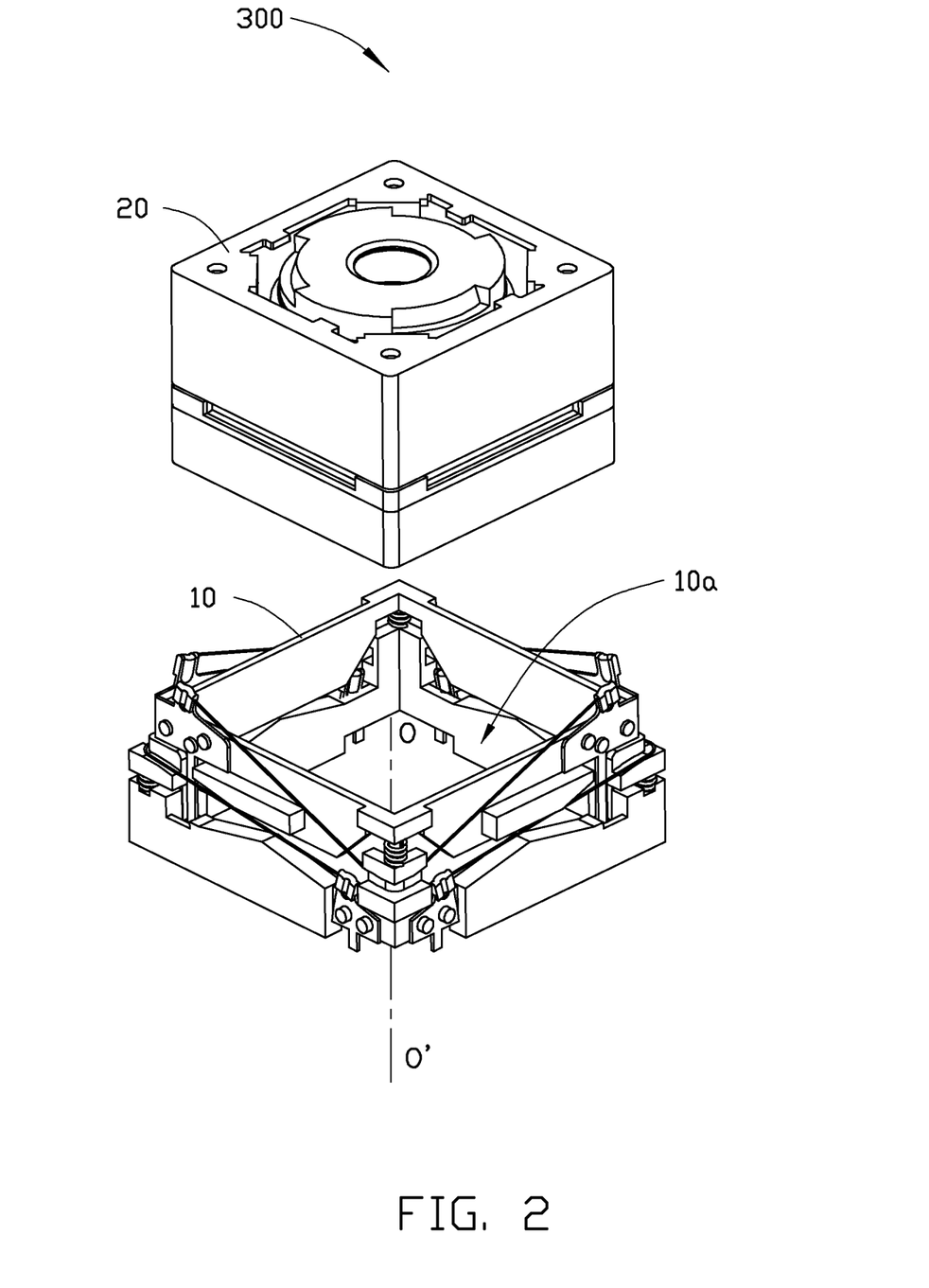
FIG. 2 is a partial exploded view of the image capturing device of FIG. 1.
Figure 4:
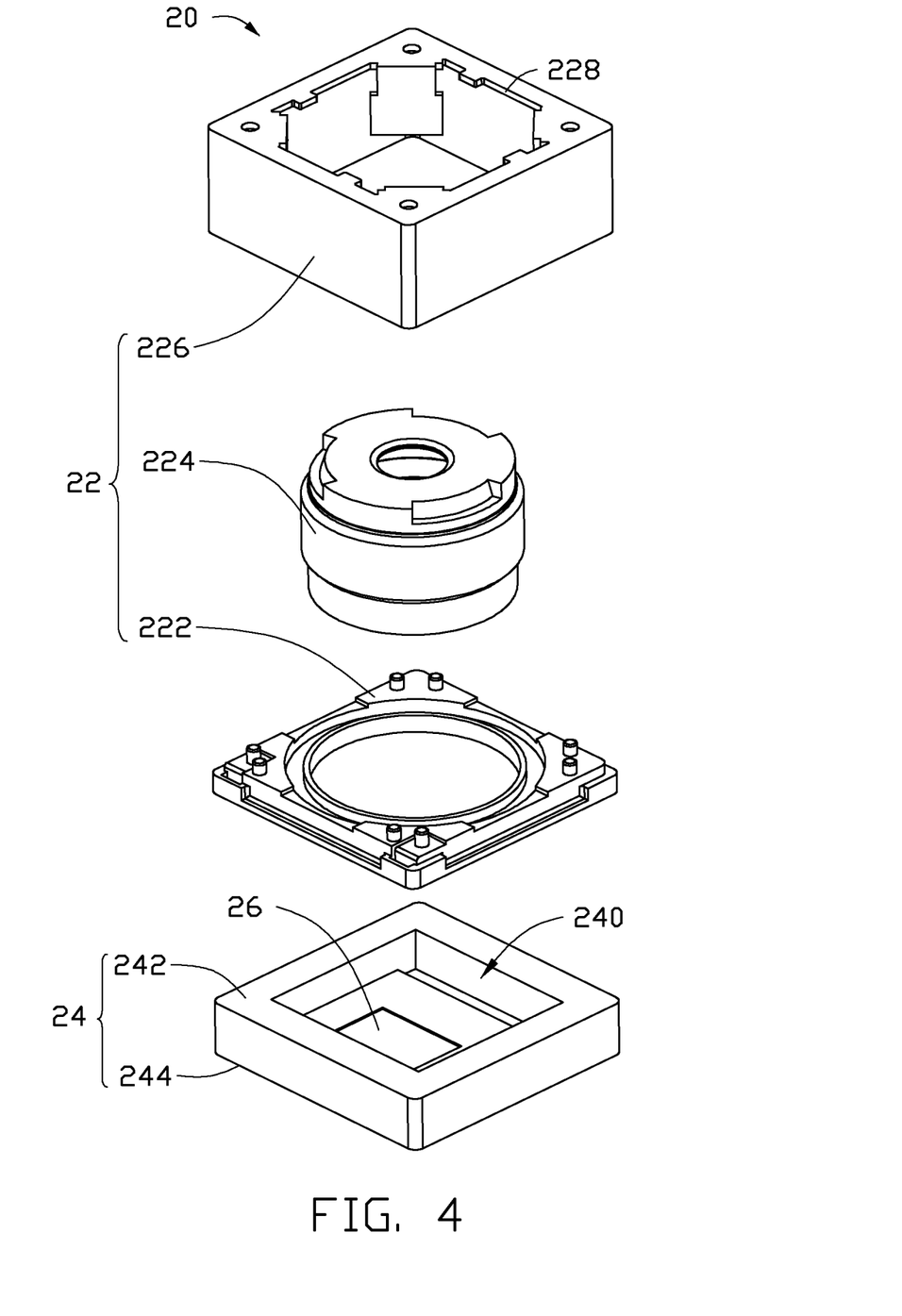
FIG. 4 is an exploded view of the camera module of FIG. 2.
Figure 5:
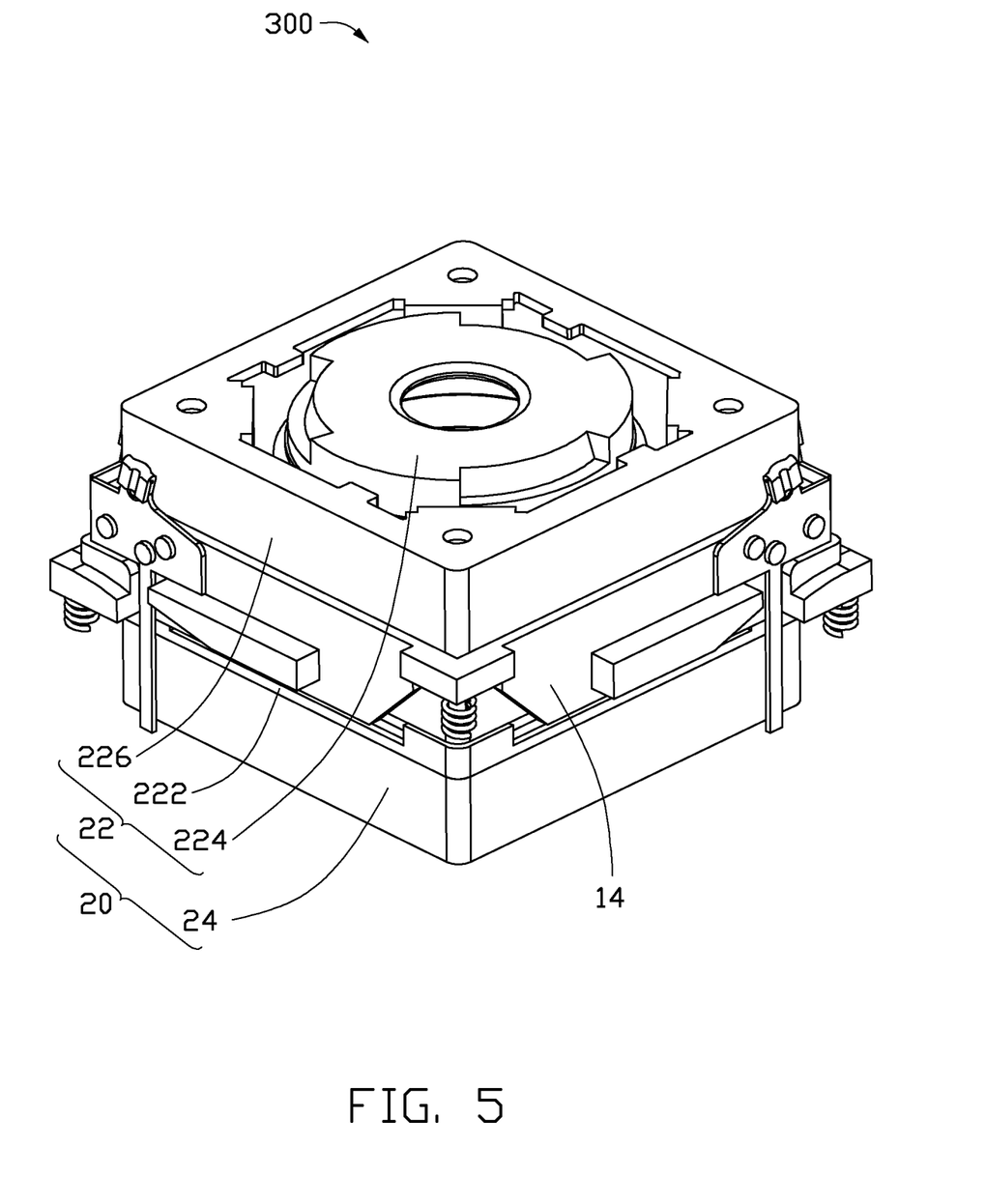
FIG. 5 is a partial, schematic, isometric view of the image capturing device of FIG. 1.
Figure 6:
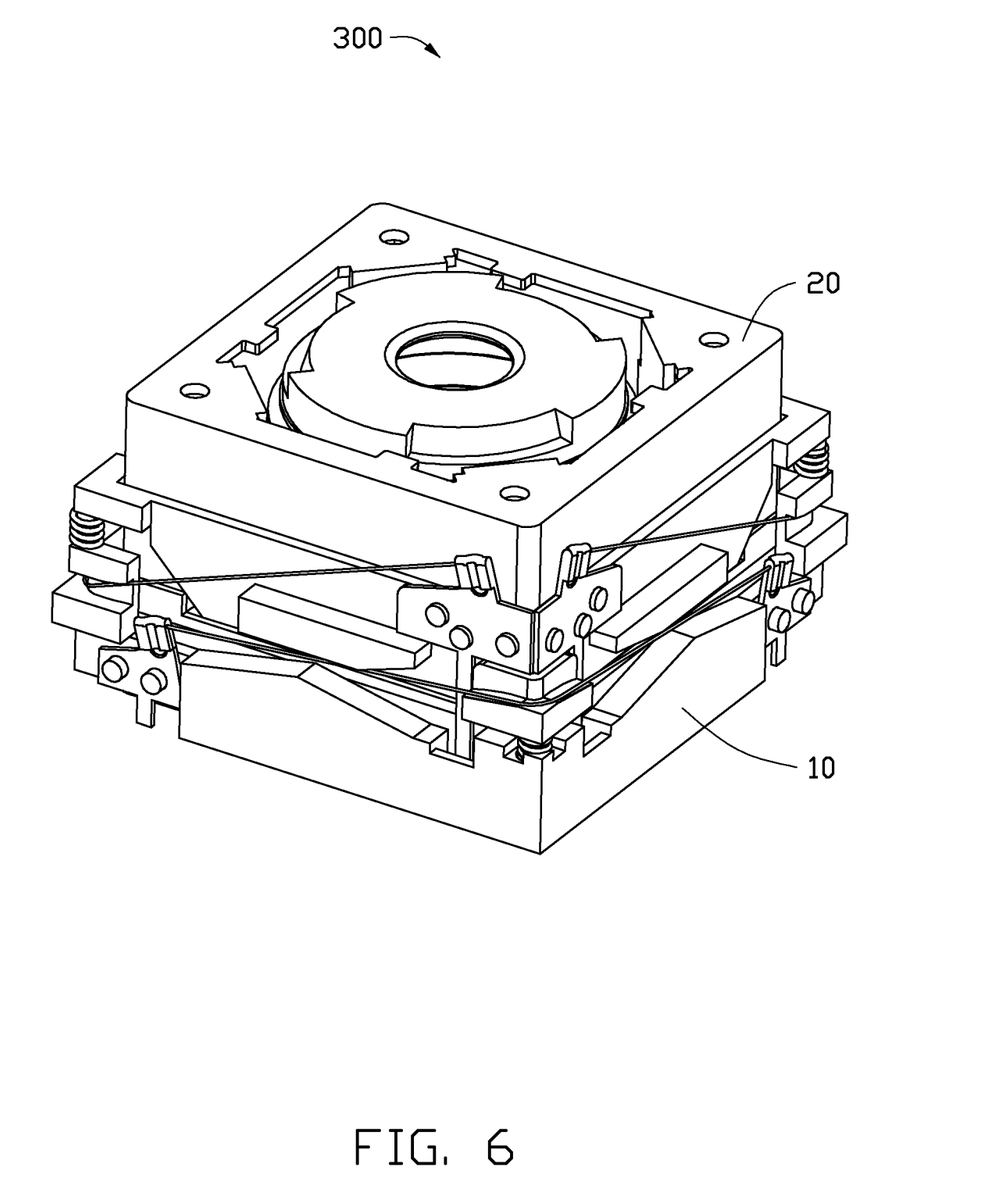
FIG. 6 is similar to FIG. 1, but viewed from another aspect.

Referring to FIG. 2 and FIG. 4, the camera module 20 includes a lens unit 22, a base 24, and an image sensor 26.

The lens unit 22 includes a lens holder 222, a lens barrel 224, and a cover 226. The lens barrel 224 is screwed into the lens holder 222 and configured to receive lenses (not shown) therein. The cover 226 is hollow and has an opening end. A light incident hole 228 is defined in the cover 226 at an end opposite to the opening end. The cover 226 is connected to the lens holder 222 by welding or by other ways. The lens barrel 224 is received in the cover 226 and is exposed to the light incident hole 228.

The base 24 is substantially a rectangular plate and includes a first planar surface 242 and a second planar surface 244. The first planar surface 242 and the second planar surface 244 are positioned at opposite sides of the base 24, and the first planar surface 242 is parallel to the second planar surface 244. The first planar surface 242 defines a receiving groove 240. The image sensor 26 is fixedly received in the receiving groove 240. The lens holder 222 is mounted on the first planar surface 242. The optical axis of the lens unit 22 is aligned with the central axis of the image sensor 26.

Referring to FIGS. 1-6, when in assembly, the moveable frame 14 is elastically connected to the stationary frame 12 using the four compression springs 162. The moveable frame 14 and the stationary frame 12 cooperatively form a receiving cavity 10a. The two first metal clips 182 are fixedly connected to the first side surface 143 and the second side surface 144. The two second metal clips 184 are fixedly connected to the first sidewall 123 and the fourth sidewall 126. The two third metal clips 192 are fixedly connected to the third side surface 145 and the fourth side surface 146, and the two fourth metal clips 194 are fixedly connected to the second sidewall 124 and the third sidewall 125.

Opposite ends of the first SMA line 186 are connected to the two first metal clips 182, and the bending portion 186a contacts and hooks the first protrusion 127. Opposite ends of the second SMA line 188 are connected to the two second metal clips 184, and the bending portion 188a contacts and hooks the first projection 147. Opposite ends of the third SMA line 196 are connected to the two third metal clips 192, and the bending portion 196a contacts and hooks the second protrusion 128. Opposite ends of the fourth SMA line 198 are connected to the two fourth metal clips 194, and the bending portion 198a contacts and hooks the second projection 148.

The camera module 20 is received in the receiving cavity 10a and apart from the stationary frame 12. The cover 226 is fixedly connected to the moveable frame 14. That is, the camera module 20 is fixed relative to the moveable frame 14. The optical axis of the lens unit 22 is aligned with the central axis OO' of the stationary frame 12.

When in use, if a current from the external circuit board is applied to the first SMA line 186 through the two first metal clips 182, the first SMA line 186 is heated and contracted. The contracted first SMA line 186 drives the moveable frame 14 and the camera module 20 to rotate about the first protrusion 127 to compensate vibration of the image capturing device 300. If the current is cut, the first SMA line 186 is cooled and extended, and the moveable frame 14 together with the camera module 20 is driven to an initial position by the compression springs 162.

If a current from the external circuit board is applied to the second SMA line 188 through the two second metal clips 184, the second SMA line 188 is heated and contracted. The contracted second SMA line 188 drives the moveable frame 14 and the camera module 20 to rotate about the first projection 147 to compensate vibration of the image capturing device 300. If the current is cut, the second SMA line 188 is cooled and extended, and the moveable frame 14 together with the camera module 20 is driven to an initial position by the compression springs 162.

If a current from the external circuit board is applied to the third SMA line 196 through the two third metal clips 192, the third SMA line 196 is heated and contracted. The contracted third SMA line 196 drives the moveable frame 14 and the camera module 20 to rotate about the second protrusion 128 to compensate vibration of the image capturing device 300. If the current is cut, the third SMA line 196 is cooled and extended, and the moveable frame 14 together with the camera module 20 is driven to an initial position by the compression springs 162.

If a current from the external circuit board is applied to the fourth SMA line 198 through the two fourth metal clips 194, the fourth SMA line 198 is heated and contracted. The contracted fourth SMA line 198 drives the moveable frame 14 and the camera module 20 to rotate about the second projection 148 to compensate vibration of the image capturing device 300. If the current is cut, the fourth SMA line 198 is cooled and extended, and the moveable frame 14 together with the camera module 20 is driven to an initial position by the compression springs 162.

The shrinkage degree of the four SMA lines 186, 188, 196, and 198 increases with the increment of the current applied to the SMA lines 186, 188, 196, and 198. Accordingly, any combination of the first SMA line 183, the second SMA line 188, the third SMA line 196, and the fourth SMA line 198 are applied to the current, the movement direction of the camera module 20 together with the moveable frame 14 is the same as the direction of a resultant force of the moveable frame 14.

In the image stabilizer 10 and the image capturing device 300, the four SMA lines 186, 188, 196, and 198 do not cross each other. Therefore, short circuit is avoided.

Figure 7:
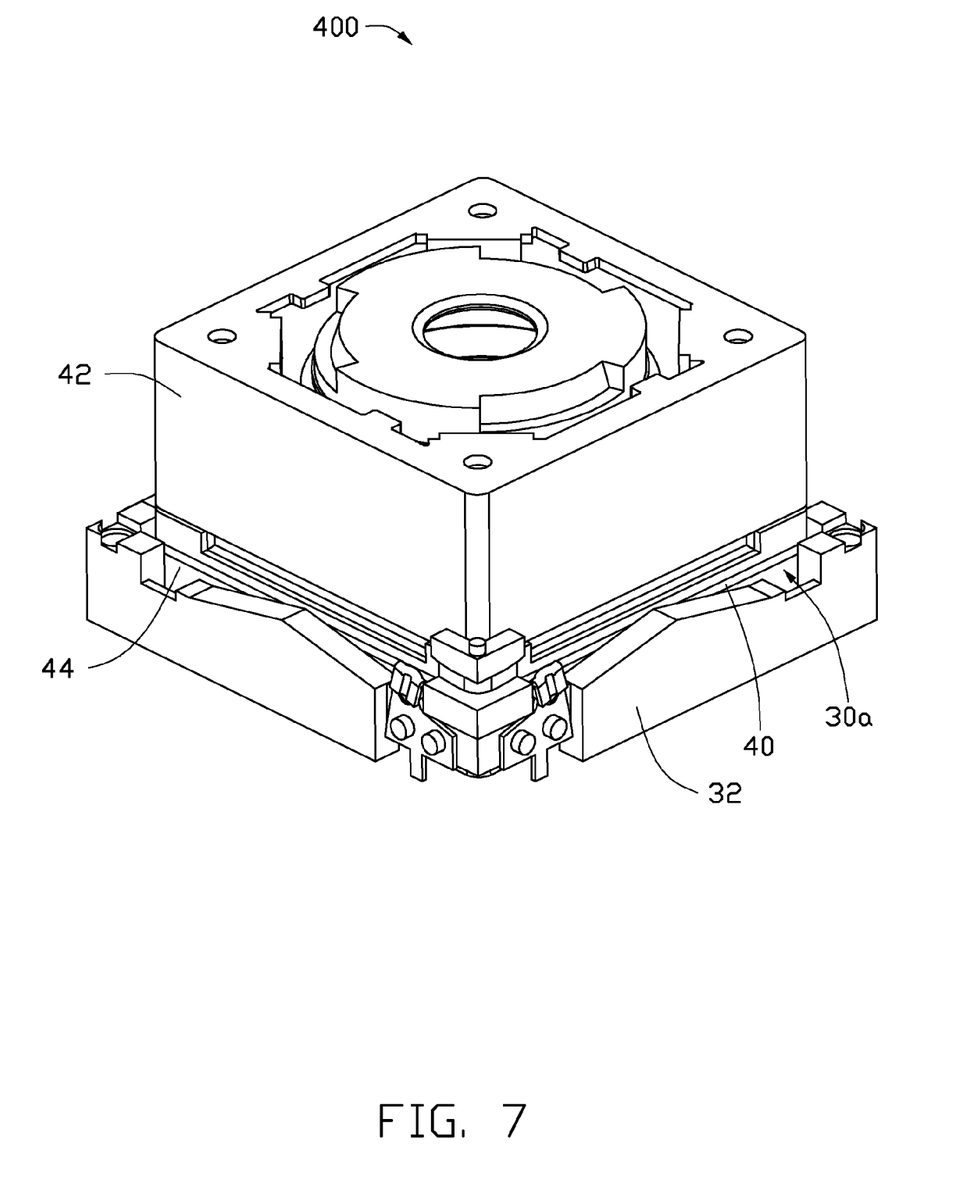
FIG. 7 is a partial, schematic, isometric view of an image capturing device, according to a second exemplary embodiment.

FIG. 7 is an image capturing device 400 according to a second exemplary embodiment. The differences between the image capturing device 400 of this embodiment and the image capturing device 300 of the first exemplary embodiment are: the base 44 and the lens unit 42 are received in the receiving cavity 30a. The base 44 is fixedly connected to the stationary frame 32. The lens unit 42 is fixedly connected to the moveable frame (not shown) and is apart from the stationary frame 12. A gap 40 is formed between the lens unit 42 and the base 44. The image capturing device 300 compensates the vibration by driving the entire camera module 20 to rotate. However, the image capturing device 400 compensates the vibration by driving the lenses (not shown) received in the lens barrel to rotate.

Advantages of the image capturing device 400 of the second exemplary embodiment are similar to those of the image capturing device 300 of the first exemplary embodiment.

Even though numerous characteristics and advantages of the present embodiments have been set fourth in the foregoing description, together with details of the structures and functions of the embodiments, the disclosure is illustrative only, and changes may be made in details, especially in matters of shape, size, and the arrangement of parts within the principles of the disclosure to the full extent indicated by the broad general meaning of the terms in which the appended claims are expressed.

What is claimed is:

1. An image stabilizer comprising:
a stationary frame defining a central axis and comprising an upper end, a lower end opposite to the upper end, and a first protrusion extending from the upper end;
a moveable frame elastically connected to the upper end, coinciding with the stationary frame, and comprising a first side surface, a second side surface, a third side surface, and a fourth side surface connected to each other end-to-end to form a first junction, a second junction, a third junction, and a fourth junction; and
a driving assembly comprising two first metal clips and a first shape memory alloy (SMA) line, the first metal clips connected to two neighboring side surfaces of the moveable frame, opposite ends of the first SMA line clipped to the respective first metal clips, a bending portion of the first SMA line between the opposite sides contacting and hooking the first protrusion, the first metal clips configured to introduce a current into the first SMA line, and the first SMA line configured to contract and drive the moveable frame to rotate about the first protrusion after the current is applied to the first SMA line;
wherein the two first metal clips are positioned at the first junction and the third junction, and the first protrusion corresponds to the second junction.

2. The image stabilizer as claimed in claim 1, wherein the moveable frame comprises a bottom end, a top end opposite to the bottom end, and a first projection, the bottom end facing the upper end, the driving assembly comprises two second metal chips and a second SMA line, the second metal chips are connected to two neighboring sidewalls of the stationary frame, opposite ends of the second SMA line are clipped to the respective second metal clips, a bending portion of the second SMA line between the opposite sides contacts and hooks the first projection, the second metal clips are configured to introduce a current into the second SMA line, and the second SMA line is configured to contract and drive the moveable frame to rotate about the first projection after the current is applied to the second SMA line.

3. The image stabilizer as claimed in claim 2, wherein the stationary frame comprises a first sidewall, a second sidewall, a third sidewall, and a fourth sidewall, the four sidewalls connect each other end-to-end to form a first joint, a second joint, a third joint, and a fourth joint corresponding to the first junction, the second junction, the third junction, and the fourth junction, the two second metal clips are positioned at the fourth joint and the second joint, and the first projection corresponds to the first joint.

4. The image stabilizer as claimed in claim 3, wherein the driving assembly further comprises two third metal chips and a third SMA line, the third metal chips are connected to the third side surface and the fourth side surface and positioned at the third junction and the first junction, the stationary frame comprises a second protrusion at the fourth joint, opposite ends of the third SMA line are clipped to the respective third metal clips, and a bending portion of the third SMA line between the opposite sides contacts and hooks the second protrusion.

5. The image stabilizer as claimed in claim 4, wherein the driving assembly further comprises two fourth metal chips and a fourth SMA line, the fourth metal chips are connected to the second sidewall and the third sidewall and positioned at the second joint and the fourth joint, the moveable frame comprises a second projection at the third junction, opposite ends of the fourth SMA line are clipped to the respective fourth metal clips, and a bending portion of the fourth SMA line between the opposite sides contacts and hooks the second projection.

6. The image stabilizer as claimed in claim 1, wherein the image stabilizer comprises a resilient assembly, the resilient assembly is configured to connect the bottom end of moveable frame to the upper end of the stationary frame.

7. The image stabilizer as claimed in claim 6, wherein the resilient assembly comprises four compression springs, and opposite ends of each of the compression springs connected to the bottom end and the upper end.

8. An image capturing device comprising:
  an image stabilizer comprising:
    a stationary frame defining a central axis and comprising an upper end, a lower end opposite to the upper end, and a first protrusion extending from the upper end;
    a moveable frame elastically connected to the upper end, coinciding with the stationary frame, the moveable frame and the stationary frame cooperatively forming a receiving cavity, and comprising a first side surface, a second side surface, a third side surface, and a fourth side surface connected to each other end-to-end to form a first junction, a second junction, a third junction, and a fourth junction; and
    a driving assembly comprising two first metal clips and a first SMA line, the first metal clips connected to two neighboring side surfaces of the moveable frame, opposite ends of the first SMA line clipped to the respective first metal clips, a bending portion of the first SMA line between the opposite sides contacting and hooking the first protrusion, the first metal clips configured to introduce a current into the first SMA line, and the first SMA line configured to contract and drive the moveable frame to rotate about the first protrusion after the current is applied to the first SMA line;
    wherein the two first metal clips are positioned at the first junction and the third junction, and the first protrusion corresponds to the second junction; and
  a camera module received in the receiving cavity, and the camera module fixedly connected to the moveable frame and apart from the stationary frame.

9. The image capturing device as claimed in claim 8, wherein the moveable frame comprises a bottom end, a top end opposite to the bottom end, and a first projection, the bottom end facing the upper end, the driving assembly comprises two second metal chips and a second SMA line, the second metal chips are connected to two neighboring sidewalls of the stationary frame, opposite ends of the second SMA line are clipped to the respective second metal clips, a bending portion of the second SMA line between the opposite sides contacts and hooks the first projection, the second metal clips are configured to introduce a current into the second SMA line, and the second SMA line is configured to contract and drive the moveable frame to rotate about the first projection after the current is applied to the second SMA line.

10. The image capturing device as claimed in claim 9, wherein the stationary frame comprises a first sidewall, a second sidewall, a third sidewall, and a fourth sidewall, the four sidewalls connect each other end-to-end to form a first joint, a second joint, a third joint, and a fourth joint corresponding to the first junction, the second junction, the third junction, and the fourth junction, the two second metal clips are positioned at the fourth joint and the second joint, and the first projection corresponds to the first joint.

11. The image capturing device as claimed in claim 10, wherein the driving assembly comprises two third metal chips and a third SMA line, the third metal chips are connected to the third side surface and the fourth side surface and positioned at the third junction and the first junction, the stationary frame comprises a second protrusion at the fourth joint, opposite ends of the third SMA line are clipped to the respective third metal clips, and a bending portion of the third SMA line between the opposite sides contacts and hooks the second protrusion.

12. The image capturing device as claimed in claim 11, wherein the driving assembly comprises two fourth metal chips and a fourth SMA line, the fourth metal chips are connected to the second sidewall and the third sidewall and positioned at the second joint and the fourth joint, the moveable frame comprises a second projection at the third junction, opposite ends of the fourth SMA line are clipped to the respective fourth metal clips, and a bending portion of the fourth SMA line between the opposite sides contacts and hooks the second projection.

13. The image capturing device as claimed in claim 8, wherein the image stabilizer comprises a resilient assembly, the resilient assembly is configured to connect the bottom end of moveable frame to the upper end of the stationary frame.

14. The image capturing device as claimed in claim 13, wherein the resilient assembly comprises four compression springs, opposite ends of each of the compression springs connected to the bottom end and the upper end.

15. An image capturing device comprising:
  an image stabilizer comprising:
    a stationary frame defining a central axis and comprising an upper end, a lower end opposite to the upper end, and a first protrusion extending from the upper end;
    a moveable frame elastically connected to the upper end, coinciding with the stationary frame, the moveable frame and the stationary frame cooperatively forming a receiving cavity, and comprising a first side surface, a second side surface, a third side surface, and a fourth side surface connected to each other end-to-end to form a first junction, a second junction, a third junction, and a fourth junction; and
    a driving assembly comprising two first metal clips and a first SMA line, the first metal clips connected to two neighboring side surfaces of the moveable frame, opposite ends of the first SMA line clipped to the respective first metal clips, a bending portion of the first SMA line between the opposite sides contacting and hooking the first protrusion, the first metal clips configured to introduce a current into the first SMA line, and the first SMA line configured to contract and drive the moveable frame to rotate about the first protrusion after the current is applied to the first SMA line;
    wherein the two first metal clips are positioned at the first junction and the third junction, and the first protrusion corresponds to the second junction; and
  a camera module comprising a lens unit, a base, and an image sensor received in the base, the lens unit and the base received in the receiving cavity, the base fixedly connected to the stationary frame, the lens unit fixedly connected to the moveable frame and apart from the base and the stationary frame, and an optical axis of the lens unit coinciding with a central axis of the image sensor.

* * * * *